No. 728,560. PATENTED MAY 19, 1903.
J. C. FOSTER.
NUT LOCK.
APPLICATION FILED JULY 5, 1902.
NO MODEL
*Fig.1*
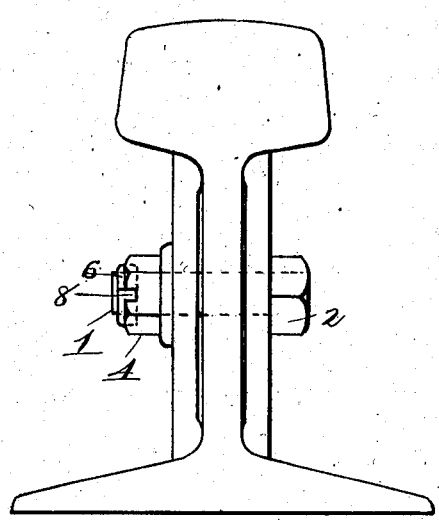
*Fig.3* *Fig.2*
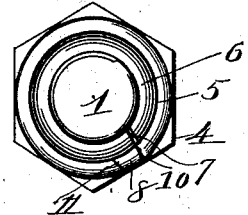
*Fig.5*
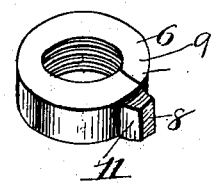
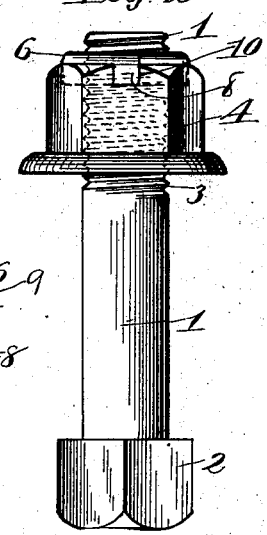
*Fig.4*
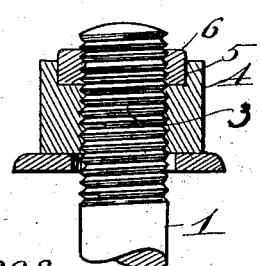
Witnesses Inventor
John C. Foster
by Wm. M. Monroe
Attorney No. 728,560.  
Patented May 19, 1903.

UNITED STATES PATENT OFFICE.

JOHN C. FOSTER, OF CLEVELAND, OHIO, ASSIGNOR OF ONE-HALF TO TERRY C. WHITNEY, OF CLEVELAND, OHIO.

NUT-LOCK.

SPECIFICATION forming part of Letters Patent No. 728,560, dated May 19, 1903.

Application filed July 5, 1902. Serial No. 114,517. (No model.)

*To all whom it may concern:*

Be it known that I, JOHN C. FOSTER, a citizen of the United States, and a resident of Cleveland, in the county of Cuyahoga, State of Ohio, have invented certain new and useful Improvements in Nut-Locks, of which I hereby declare the following to be a full, clear, and exact description, such as will enable others skilled in the art to which it appertains to make and use the same.

My invention relates to improvements in nut-locks, and its objects are to provide a form of locking device by means of which the nut will be firmly secured to the thread of the bolt when it is attemped to unscrew it, but will readily screw onto the bolt.

My invention consists in the recessed nut and a split gripping-nut inserted therein, with the details of construction and combination and arrangement of parts as shown in the accompanying drawings and specifically pointed out in the claim.

In the accompanying drawings, Figure 1 is an end view of a rail and its accompanying fish-plates secured together by a bolt provided with my improved lock-nut. Fig. 2 is an enlarged view of the bolt. Fig. 3 is a plan view of the same. Fig. 4 is a longitudinal section through the threaded end of bolt, showing both nuts also in section. Fig. 5 is an isometric view of the outer nut.

In the views, 1 is the bolt; 2, the head; 3, the screw-threaded portion. 4 is the large nut. This nut is annularly recessed at 5 to permit the insertion of the small nut 6, which is split by a narrow slot 7 on one side, and a projection 8 is formed upon one side of the slot and is also upon the edge of the slot which is in advance as the nut is screwed up, the edge 9 following being left without a projection. This projection fits into the radial slot 10 in the wall of the recess in the large nut.

In use it will be seen that when both nuts are placed upon the thread of the bolt, the small one within the recess in the large one, both nuts can readily be screwed together down the bolt, but that when it is attempted to unscrew them the wall of the slot 10 in the large nut will engage the projection on the split nut and bend down that end of the ring against the thread of the bolt, thus compressing it the more firmly as the greater is the effort to unscrew it.

The split nut is preferably formed of spring metal, and when the end is compressed against the screw-thread of the bolt it serves as a friction strap or brake, engaging more tightly the greater the effort made to turn the nut.

This device has the advantage that it can be unscrewed by a powerful wrench; but no jar or vibration, such as would be encountered by rolling-stock or in road-vehicles, would unscrew it.

The gripping-power of the split nut might be increased by sloping away the engaging side of the projection at 11 and the corresponding side of the slot 10 in the large nut, so as to present inclined planes whose wedge action would compress the split nut strongly upon the screw-thread.

The split nut is first tapped out about one-sixteenth of an inch smaller than the thread of the bolt, so that it will always have a grip upon the bolt, and a slight increase in the pressure will serve to prevent turning it.

Having described my invention, what I claim as new, and desire to secure by Letters Patent, is—

In nut-locks, a threaded bolt, in combination with a main nut having a recess in its side and a radial slot open thereto, and a split spring clamping-nut having a threaded bore of less diameter than the cross-section of said bolt, whereby when said nut is placed on the bolt it has to be sprung open and enlarged, and the said spring clamping-nut located in the recess of the main nut and having a projection upon its outer edge engaged in the radial slot of the main nut, substantially as described.

JOHN C. FOSTER.

Witnesses:
 WM. M. MONROE,
 S. M. NEVILLE,
 R. ZBORNIK.